United States Patent Office 3,474,092
Patented Oct. 21, 1969

3,474,092
NITRO-DERIVATIVES OF URON AND UREA
Andrew Harper Dinwoodie, Dalry, and Godfrey Fort, Ardrossan, Scotland, assignors, by mesne assignments, to the United States of America as represented by the Secretary of the Navy
No Drawing. Filed Mar. 10, 1967, Ser. No. 622,030
Claims priority, application Great Britain, Apr. 6, 1966, 15,456/66
Int. Cl. C07d 87/52; C07c 127/16; C06b 17/00
U.S. Cl. 260—244
5 Claims

ABSTRACT OF THE DISCLOSURE

Organic compounds which are N-methoxymethyl-N'-(2,2,2-trinitroethyl)uron, N,N'-(2,2,2-trinitroethyl)uron and N,N'-bis(acetoxymethyl)-N,N'-bis(2,2,2-trinitroethyl)urea. They are explosive and useful energetic constituents of explosive or propellant compositions. The uron compounds are prepared by reacting nitroform with N,N'-bis(methoxymethyl)uron. The urea compound is prepared by heating N,N'-bis(2,2,2-trinitroethyl)uron with concentrated sulphuric acid and acetic anhydride at 20° C.

---

This invention relates to new compounds which may be classified broadly as 2,2,2-trinitroethyl substituted uron and urea derivatives, the urea derivatives being hydrolysed urons wherein the uron ring is broken to form ester derivatives. The invention also includes processes for the preparation of these compounds. The compounds of the invention are explosive and are useful energetic constituents of explosive or propellant compositions.

The uron derivatives of the invention may be represented by the general Formula I and the urea derivatives by Formula II $$\begin{array}{cc}
\underset{\text{(I)}}{\begin{array}{c} \text{CO} \\ \diagup \phantom{xxx} \diagdown \\ \text{RCH}_2\text{N} \phantom{xxx} \text{N—CH}_2\text{C(NO}_2)_3 \\ | \phantom{xxxxxxx} | \\ \text{H}_2\text{C} \phantom{xxxxx} \text{CH}_2 \\ \diagdown \phantom{xx} \diagup \\ \text{O} \end{array}} &
\underset{\text{(II)}}{\begin{array}{c} \text{CO} \\ \diagup \phantom{xxx} \diagdown \\ \text{RCH}_2\text{N} \phantom{xxx} \text{N—CH}_2\text{C(NO}_2)_3 \\ | \phantom{xxxxxxx} | \\ \text{H}_2\text{C} \phantom{xxxxx} \text{CH}_2 \\ | \phantom{xxxxxxx} | \\ \text{OR}^1 \phantom{xxxx} \text{OR}^2 \end{array}}
\end{array}$$

wherein R represents a hydroxyl, alkoxy, acyloxy or aroyloxy group or a further trinitromethyl group. and $R^1$ and $R^2$, which may be the same or different, each also represents an acyl or aroyl group.

In accordance with the invention the uron derivatives of Formula I are prepared by treating a N-substituted uron derivative of Formula III $$\begin{array}{c} \text{CO} \\ \diagup \phantom{xxx} \diagdown \\ \text{RCH}_2\text{N} \phantom{xxx} \text{NCH}_2\text{OR}^3 \\ | \phantom{xxxxxxx} | \\ \text{H}_2\text{C} \phantom{xxxxx} \text{CH}_2 \\ \diagdown \phantom{xx} \diagup \\ \text{O} \end{array}$$

(III)

wherein R has the meaning given above and $R^3$ is hydrogen or an alkyl, acyl or aroyl group, with nitroform, preferably at elevated temperature. A reaction temperature of 80–100° C. is convenient. The reaction may be represented as:

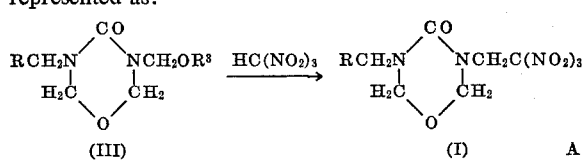

When the group R is of the form —OR³ this group may also be replaced by a trinitromethyl group to give N,N'-bis(2,2,2-trinitroethyl)uron and in this case the use of substantially equimolar quantities of the starting compound III and nitroform favours the formation of the monosubstituted compound and the use of two or more moles of nitroform to each mole of the starting compound favours the formation of the disubstituted compound.

The uron derivatives used as the starting material may be prepared by the method described in an article by H. Kadowaki in Bull. Chem. Soc. Japan, II, 1936, page 248 or by the method described in Belgian patent specification No. 626,590; the latter method gives the purer product. A preferred starting material is N,N'-bis(methoxymethyl)uron which gives the products N-methoxymethyl-N' - (2,2,2 - trinitroethyl)uron and N,N'-bis(2,2,2-trinitroethyl)uron.

When the uron derivatives of Formula I are subjected to treatment with strong acids in the presence of a carboxylic acid anhydride the ring is broken to form an ester derivative of urea. This reaction may be represented as:

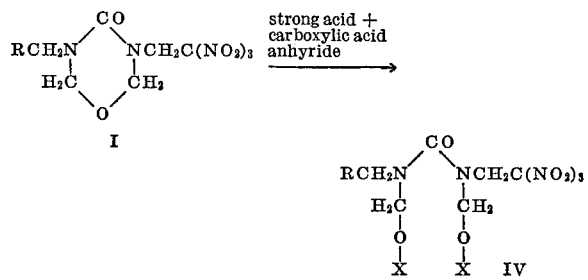

where R has the meaning given above and X is an acyl or aroyl group.

Urea derivatives of Formula IV wherein R is a trinitromethyl group are especially preferred and readily prepared. A preferred ester of the Formula IV is the diacetate, N,N'-bis(acetoxymethyl)-N,N' - bis(2,2,2 - trinitroethyl)urea.

The invention is further illustrated by the following examples in which all parts and percentages are by weight.

EXAMPLE 1

N,N'-bis(methoxymethyl)uron was prepared by the method described in the first example of Belgian patent specification No. 626,590, and distilled (B.P. 118–120° C. at 0.6–0.9 mm.). The distillate was found to contain: C, 44.3%; H, 7.15%; N, 14.8%; —OCH₃, 33.6%. The theoretical analysis of N,N'-bis(methoxymethyl)uron, $C_7H_{14}N_2O_4$, requires: C, 44.2%; H, 7.4%; N, 14.7%; —OCH₃, 32.6%. The infra-red spectrum of the distillate showed no NH-absorption in the 3μ region and was similar to that given in Journal of Organic Chemistry, 28, 1963, 1876 for pure N,N'-bis(methoxymethyl)uron.

1.51 parts of nitroform and 2.38 parts of N,N'-bis-(methoxymethyl)uron, i.e. a molar ratio of 0.8:1, were heated in 5 parts of methanol on a steam bath in a flask fitted with an air-condenser carrying a calcium chloride tube. After 3 hours the methanol was removed and the yellow liquid remaining was dissolved in 72 parts of diethyl ether, washed 4 times with 50 parts 5% aqueous sodium bicarbonate and twice with 50 parts of water, then dried. Removal of the solvent gave 2.1 parts of N-methoxymethyl-N'-(2,2,2-trinitroethyl)uron in the form of a colourless crystalline solid, which was recrystallised from 1:1 isopropanol:hexane, and which melted at 63–65° C. The solid product was found to contain: C, 27.4%; H, 3.7%; N, 22.7%. The theoretical analysis of N-methoxymethyl-N'-(2,2,2-trinitroethyl)uron, $C_7H_{11}N_5O_9$, requires: C, 27.2%; H, 3.6%; N, 22.6%.

The infra-red spectrum showed strong absorptions at 6.05μ due to =CO, at 6.3μ due to —NO₂, and other strong absorptions at 6.8, 7.8, 9.4, 9.9 and 12.4–12.5$\mu$. Weaker absorptions were shown at 8.6, 9.2, 10.3, 11.1, 11.6, 11.7, 12.8 and 13.4$\mu$.

A sample of the product exploded when heated at a rate of 5° C. per minute in an open vessel at 152.5° C. In an impact sensitivity test in which a ½ kg. mild steel hammer was dropped from various heights on to small samples of the product on a mild steel anvil, the samples exploded when the height was 80 cm. but not when the height was 60 cm.

EXAMPLE 2

The N,N'-bis(methoxymethyl)uron used in this example was a distilled sample prepared by the method of Kadowaki (loc. cit.). It showed a medium NH-absorption band at 3.0$\mu$ in its infra-red spectrum and was found to contain: C, 43.8%; H, 7.8%; N, 14.5%; —OCH$_3$, 30.6%. The theoretical analysis for N,N'-bis(methoxymethyl)uron, $C_7H_{14}N_2O_4$, requires: C, 44.2%; H, 7.4%; N, 14.7%; —OCH$_3$, 32.6%.

2.85 parts of nitroform and 1.43 parts of the crude N,N'-bis(methoxymethyl)uron, i.e. a molar ratio of 2.5:1, were heated on a steam bath for 3 hours in a flask fitted with an air-condenser carrying a calcium chloride tube. The final reaction mixture contained some crystalline N,N'-bis(2,2,2-trinitroethyl)uron. After addition of 22 parts ether more solid product crystallised and was filtered off, washed with ether and then with water and dried in a desiccator. The total yield of crude N,N'-bis(2,2,2-trinitroethyl)uron, which melted with decomposition at 171–172° C., was 1.05 parts. The product, after two recrystallisations from hot ethanol, melted at 174–175° C. and was found to contain: C, 19.9% H, 2.5%; N, 26.1%; the molecular weight was found to be 343 by an ebullioscopic method in acetone. The theoretical analysis of N,N'-bis(2,2,2-trinitroethyl)uron, $C_7H_8N_8O_{14}$, requires: C, 19.6%; H, 1.9%; N, 26.2%; its theoretical molecular weight is 428.

The absence of absorption in the 3$\mu$ region of the infra-red spectrum of the product indicated the absence of —NH groups, the strong absorptions at 6.2–6.45$\mu$ were due to —NO$_2$ and the strong absorption at 6.05$\mu$ was due to =CO. The infra-red spectrum also showed strong absorptions at 6.8, 7.6, 7.7–7.8, 11.6, 12.4, 12.45 and 13.4$\mu$ and weaker absorptions at 7.2, 8.0, 8.4, 8.6, 9.1, 9.2, 9.7, 9.85, 10.15, 11.75, 12.6, 12.9, 13.0 and 14.0$\mu$.

The proton magnetic resonance spectrum at 60 megacyles/sec. of the product in acetone solution, using tetramethylsilane as internal reference, showed two peaks at 4.81 and 4.58$\mu$ in the ratio of 1:1. These peaks were in the region of the spectrum consistent with the resonance of hydrogen nuclei in methylene groups. Deuteration of the solution showed that no —NH or —OH groups were present.

The N,N'-bis(2,2,2-trinitroethyl)uron produced in this example exploded on percussion. In an impact sensitivity test in which a ½ kg. mild steel hammer was dropped from various heights on to small samples on a mild steel anvil, the samples exploded when the height was 20 cm., but not when it was 10 cm. When a 0.1 g. sample was heated in an open round-bottomed glass tube at a rate of 5° C. per minute it exploded when the temperature reached 169° C.

EXAMPLE 3

2.85 parts of nitroform were reacted in the manner described in Example 2 with 1.43 parts of N,N'-bis(methoxymethyl)uron, prepared by the method described in Belgian Patent No. 626,590, i.e. a molar ratio of 2.5:1. The product was 2.5 parts of N,N'-bis(2,2,2-trinitroethyl)uron which melted with decomposition at 170–172° C., and which had the same infra-red spectrum as the product obtained in Example 2. The yield of N,N'-bis(2,2,2-trinitroethyl)uron, based on the N,N'-bis(methoxymethyl)uron used, was 78% of theoretical.

EXAMPLE 4

20 parts of N,N'-bis(2,2,2-trinitroethyl)uron as prepared in Example 3 were treated with 540 parts acetic anhydride and 46 parts of concentrated sulphuric acid for 4 days at 20° C. The reaction mixture was then poured into 2500 parts of water containing 150 parts of hydrated sodium acetate and an oil was obtained which solidified on standing and stirring. The solid was filtered off, washed with water and dried in a desiccator. The product was 16 parts of crude N,N'-bis(acetoxymethyl)-N,N'-bis(2,2,2-trinitroethyl)urea, which melted at 90–100° C. After recrystallisation from hot methanol the purified product melted at 98–100° C. and was found to contain: C, 24.5%; H, 1.7%; N, 21.7%. The theoretical analysis of N,N'-bis(acetoxymethyl)-N,N' - bis(2,2,2 - trinitroethyl) urea, $C_{11}H_{14}N_8O_{17}$, requires: C, 24.9%; H, 2.7%; N, 21.1%. The infra-red spectrum of the product showed no absorption in the 3$\mu$ region indicating the absence of —OH and —NH groups. Strong absorptions were shown at 5.8$\mu$ due to the acetate =CO, at 6.1$\mu$ due to the urea =CO and at 6.2 and 6.35$\mu$ due to the —NO$_2$ groups. There were also strong absorptions at 6.7, 6.9, 7.5, 7.7, 8.2–8.3, 8.5, 9.75, 10.3, 11.5 and 12.4$\mu$, and weaker absorptions at 9.1, 11.7, 12.75, 12.9 and 13.2$\mu$.

What we claim is:

1. A compound selected from the group consisting of N-methoxymethyl-N'-(2,2,2-trinitroethyl)uron, N,N'-bis(2,2,2-trinitroethyl)uron and N,N'-bis(acetoxymethyl)-N,N'-bis(2,2,2-trinitroethyl)urea.

2. N-methoxymethyl-N'-(2,2,2-trinitroethyl)uron.

3. N,N'-bis(2,2,2-trinitroethyl)uron.

4. N,N'-bis(acetoxymethyl)-N,N' - bis(2,2,2 - trinitroethyl)urea.

5. A process for the preparation of a uron compound defined in claim 1 which comprises reacting N,N'-bis(methoxymethyl)uron with nitroform at a temperature in the range of about 80–100° C.

References Cited

UNITED STATES PATENTS 3,097,239    7/1963    Tawney _____ 260—553

OTHER REFERENCES

Arceneaux et al.: I&EC Product Research and Development, vol. 1, pp. 181–83 (1962), TPI. I532.

Noller Chemistry of Organic Compounds, 2nd ed., pp. 140 and 163, Philadelphia, Saunders, 1957.

Nordhy et al., ACTA Chem. Scand., vol. 13, pp. 864–8 (1959).

HENRY R. JILES, Primary Examiner

NATALIE TROUSOF, Assistant Examiner